US012694807B2

(12) United States Patent　　　　(10) Patent No.:　US 12,694,807 B2
　　Kim et al.　　　　　　　　　　　(45) Date of Patent:　　　Jul. 28, 2026

(54) WEARABLE DEVICE ON WHICH VIRTUAL OBJECT IS DISPLAYED BY USING SINGLE DISPLAY MODULE OR PLURALITY OF DISPLAY MODULES, AND CONTROL METHOD THEREOF

(71) Applicant: Samsung Electronics Co., Ltd., Suwon-si (KR)

(72) Inventors: Seungnyun Kim, Suwon-si (KR); Dongil Son, Suwon-si (KR); Jongmin Yoon, Suwon-si (KR); Seungjoo Lee, Suwon-si (KR); Gisoo Lim, Suwon-si (KR); Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/071,131

(22) Filed: Mar. 5, 2025

(65) Prior Publication Data

US 2025/0201155 A1　　Jun. 19, 2025

Related U.S. Application Data

(63) Continuation of application No. PCT/KR2023/012956, filed on Aug. 31, 2023.

(30) Foreign Application Priority Data

Sep. 15, 2022　(KR) ........................ 10-2022-0116413
Dec. 9, 2022　(KR) ........................ 10-2022-0171314

(51) Int. Cl.
　　*G09G 3/00*　　　　(2006.01)
　　*G02B 27/01*　　　(2006.01)
　　*G06F 3/01*　　　　(2006.01)

(52) U.S. Cl.
　　CPC ......... *G09G 3/003* (2013.01); *G02B 27/0179* (2013.01); *G06F 3/012* (2013.01);
　　(Continued)

(58) Field of Classification Search
　　CPC ........... G09G 3/003; G09G 2320/0613; G09G 2330/021; G09G 2340/0435;
　　(Continued)

(56) References Cited

U.S. PATENT DOCUMENTS 9,582,081　B1 *　2/2017　Costa ................. G02B 27/0172
2012/0249797　A1　10/2012　Haddick et al.
(Continued)

FOREIGN PATENT DOCUMENTS

CN　　106873995　A　　6/2017
CN　　114578940　A　　6/2022
(Continued)

OTHER PUBLICATIONS

European Search report dated Sep. 23, 2025, issued in European Application No. 23865769.6.

(Continued)

*Primary Examiner* — Xuemei Zheng
(74) *Attorney, Agent, or Firm* — Jefferson IP Law, LLP

(57)　　　　　　ABSTRACT

A wearable device is provided. The wearable device includes a first display module, a second display module, memory storing one or more computer programs, and one or more processors communicatively coupled to the first display module, the second display module, and the memory, wherein the one or more computer programs include computer-executable instructions that, when executed by the one or more processors individually or collectively, cause the wearable device to output image data through the first display module and the second display module in a first mode, switch from the first mode to a second mode based on (Continued)

at least one of an occurrence of a notification event, a moving speed of the wearable device, or a type of an application executing on the wearable device, determine any one of the first display module or the second display module as an output display module in the second mode, and control the output display module to output the image data through the determined output display module.

20 Claims, 15 Drawing Sheets

(52) U.S. Cl.
CPC .............. *G06F 3/013* (2013.01); *G06F 3/017* (2013.01); *G02B 2027/0187* (2013.01); *G09G 2320/0613* (2013.01); *G09G 2320/08* (2013.01); *G09G 2330/021* (2013.01); *G09G 2354/00* (2013.01)

(58) Field of Classification Search
CPC .............. G02B 27/017; G02B 27/0179; G02B 27/0093; G02B 27/0172; G02B 2027/0138; G02B 2027/0134; G02B 2027/014; G02B 2027/0141; G02B 2027/0147; G02B 2027/0132; G02B 2027/0178; G02B 27/012; G02B 27/013
See application file for complete search history.

(56) References Cited

U.S. PATENT DOCUMENTS

| | | | |
|---|---|---|---|
| 2017/0011706 A1 | 1/2017 | Namkung et al. | |
| 2019/0109938 A1 | 4/2019 | Jeong et al. | |
| 2019/0172262 A1* | 6/2019 | McHugh | G06F 3/011 |
| 2019/0271844 A1 | 9/2019 | Kress et al. | |
| 2021/0063746 A1* | 3/2021 | Aiki | G02B 27/017 |
| 2021/0333561 A1 | 10/2021 | Oh et al. | |
| 2022/0060622 A1* | 2/2022 | Brändli | G06F 1/3215 |

FOREIGN PATENT DOCUMENTS

| | | | |
|---|---|---|---|
| KR | 10-2015-0001433 A | 1/2015 | |
| KR | 10-2015-0031076 A | 3/2015 | |
| KR | 10-2016-0004644 A | 1/2016 | |
| KR | 10-2016-0005878 A | 1/2016 | |
| KR | 10-1687174 B1 | 12/2016 | |
| KR | 10-2019-0106913 A | 9/2019 | |
| KR | 10-2021-0117289 A | 9/2021 | |
| KR | 10-2337907 B1 | 12/2021 | |
| KR | 10-2022-0030806 A | 3/2022 | |

OTHER PUBLICATIONS

International Search Report and written opinion dated Nov. 29, 2023, issued in International Application No. PCT/KR2023/ 012956.
European Search report dated Jun. 23, 2026, issued in European Application No. 23 865 769.6.

* cited by examiner

WEARABLE DEVICE ON WHICH VIRTUAL OBJECT IS DISPLAYED BY USING SINGLE DISPLAY MODULE OR PLURALITY OF DISPLAY MODULES, AND CONTROL METHOD THEREOF

CROSS-REFERENCE TO RELATED APPLICATION(S)

This application is a continuation application, claiming priority under 35 U.S.C. § 365(c), of an International application No. PCT/KR2023/012956 filed, on Aug. 31, 2023, which is based on and claims the benefit of a Korean patent application number 10-2022-0116413, filed on Sep. 15, 2022, in the Korean Intellectual Property Office, and of a Korean patent application number 10-2022-0171314, filed on Dec. 9, 2022, in the Korean Intellectual Property Office, the disclosure of each of which is incorporated by reference herein in its entirety.

BACKGROUND

1. Field

The disclosure relates to a wearable device displaying a virtual object using a single display module or a plurality of display modules and a method for controlling the same.

2. Description of Related Art

More and more services and additional functions are being provided via a wearable electronic device, such as augmented reality (AR) glasses. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

The above information is presented as background information only to assist with an understanding of the disclosure. No determination has been made, and no assertion is made, as to whether any of the above might be applicable as prior art with regard to the disclosure.

SUMMARY

A wearable device (e.g., AR glasses) may provide a virtual object to the user through a display module. In this case, the wearable device may output image data (e.g., red, green, blue (RGB) data) for showing the virtual object to the user using a plurality of display modules (e.g., a first display module and a second display module) to provide a three dimensional (3D) virtual object to the user. However, even when displaying, through the wearable device, a message which is simple (e.g., which need not be displayed as a 3D image) such as a short message service (SMS) notification message and/or a system notification message (e.g., a battery level status notification message or a missing call notification message) while the user uses the wearable device, the conventional wearable device is configured to display the message through a plurality of display modules (e.g., a first display module and a second display module).

Aspects of the disclosure are to address at least the above-mentioned problems and/or disadvantages and to provide at least the advantages described below. Accordingly, an aspect of the disclosure is to provide a wearable device capable of saving current consumption of the display module by outputting image data for providing the user with a virtual object using a single display module (e.g., a first display module or a second display module) or a plurality of display modules depending on the context of the user wearing the wearable device and/or the type of the message.

Another aspect of the disclosure is to provide a method for controlling a wearable device capable of saving current consumption of the display module by outputting image data for providing the user with a virtual object using a single display module (e.g., a first display module or a second display module) or a plurality of display modules depending on the context of the user wearing the wearable device and/or the type of the message.

Additional aspects will be set forth in part in the description which follows and, in part, will be apparent from the description, or may be learned by practice of the presented embodiments.

In accordance with an aspect of the disclosure, a wearable device is provided. The wearable device includes a first display module, a second display module, memory storing one or more computer programs, and one or more processors communicatively coupled to the first display module, the second display module, and the memory, wherein the one or more computer programs include computer-executable instructions that, when executed by the one or more processors individually or collectively, cause the wearable device to output image data through the first display module and the second display module in a first mode, switch from the first mode to a second mode based on at least one of an occurrence of a notification event, a moving speed of the wearable device, or a type of an application executing on the wearable device, determine any one of the first display module or the second display module as an output display module in the second mode, and control the output display module to output the image data through the determined output display module.

In accordance with another aspect of the disclosure, a method for controlling a wearable device is provided. The method includes outputting image data through a first display module of the wearable device and a second display module of the wearable device in a first mode, switching from the first mode to a second mode based on at least one of an occurrence of a notification event, a moving speed of the wearable device, or a type of an application executing on the wearable device, determining any one of the first display module or the second display module as an output display module in the second mode, and controlling the output display module to output the image data through the determined output display module.

In accordance with another aspect of the disclosure, one or more non-transitory computer-readable storage media storing one or more computer programs including computer-executable instructions that, when executed by one or more processors of a wearable device individually or collectively, cause the wearable device to perform operations are provided. The operations include outputting image data through a first display module of the wearable device and a second display module of the wearable device in a first mode, switching from the first mode to a second mode based on at least one of an occurrence of a notification event, a moving speed of the wearable device, or a type of an application executing on the wearable device, determining any one of the first display module or the second display module as an output display module in the second mode, and controlling the output display module to output the image data through the determined output display module.

In accordance with another aspect of the disclosure, a wearable device capable of saving current consumption of the display module by outputting image data for providing the user with a virtual object using a single display module (e.g., a first display module or a second display module) or a plurality of display modules depending on the context of the user wearing the wearable device and/or the type of the message is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a micropro-cessor unit (MPU), a system on chip (SoC), an IC, or the like.

Figure 1:
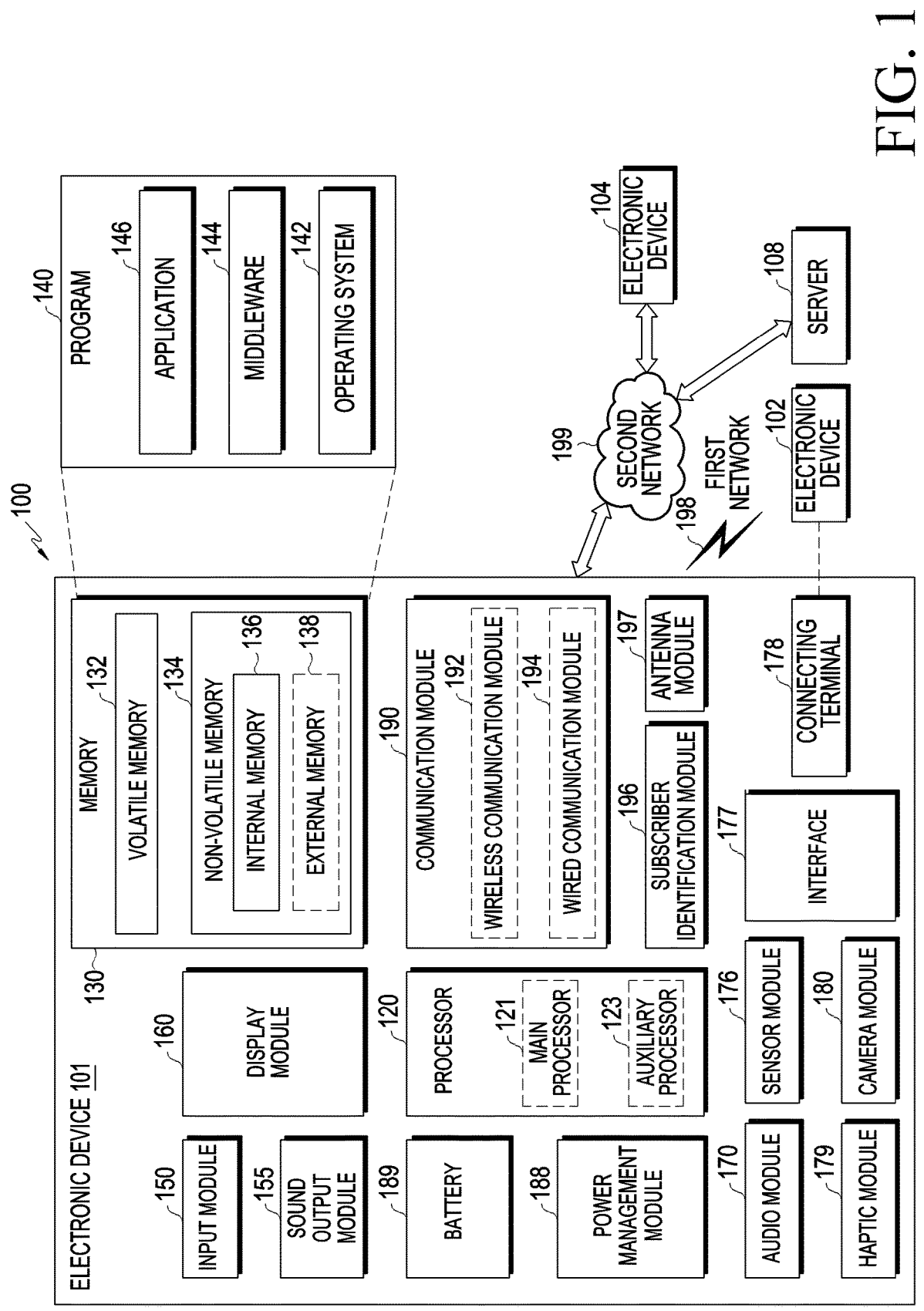
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
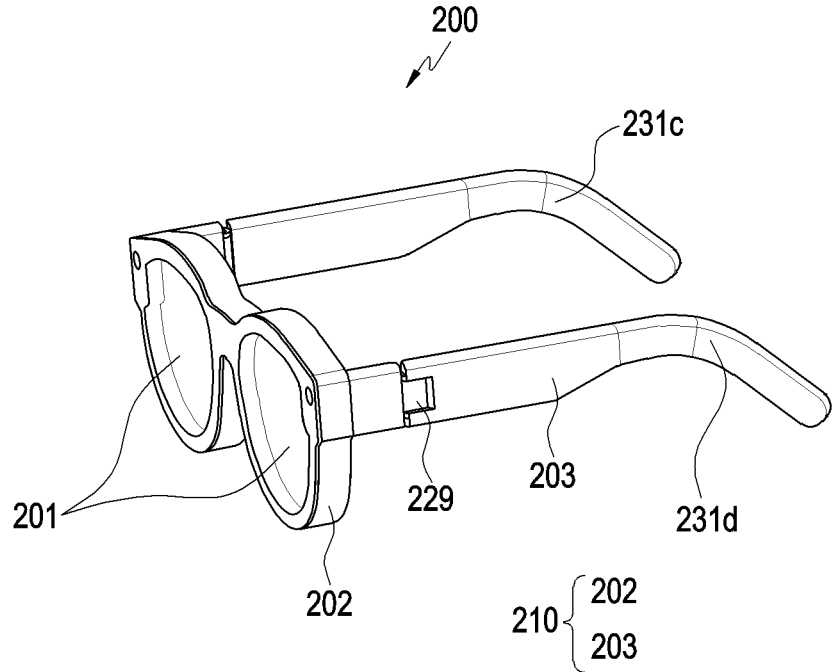
FIG. 2 is a perspective view illustrating a wearable device according to an embodiment of the disclosure.

FIG. 2 is a perspective view illustrating a wearable device 200 according to an embodiment of the disclosure.

Referring to FIG. 2, the wearable device 200 may be a glasses-type electronic device, and the user may visually recognize her surrounding objects or environment while wearing the wearable device 200. For example, the wearable device 200 may be a head-mounted device (HMD) or smart glasses capable of providing images directly in front of the user's eyes. The configuration of the wearable device 200 of FIG. 2 may be identical in whole or part to the configuration of the electronic device 101 of FIG. 1.

According to various embodiments, the wearable device 200 may include a housing that forms the exterior of the wearable device 200. The housing 210 may provide a space in which components of the wearable device 200 may be disposed. For example, the housing 210 may include a lens frame 202 and at least one wearing member 203.

According to various embodiments, the wearable device 200 may include a display member 201 capable of providing the user with visual information. For example, the display member 201 may include a module equipped with a lens or a window member, a display, a waveguide, and/or a touch circuit. According to an embodiment, the display member 201 may be transparent or semi-transparent. According to an embodiment, the display member 201 may include a semi-transparent glass or a window member the light transmittance of which may be adjusted as the coloring concentration is adjusted. According to an embodiment, a pair of display members 201 may be provided and disposed to correspond to the user's left and right eyes, respectively, with the wearable device 200 worn on the user's body.

According to various embodiments, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices (display members 201).

According to various embodiments, the wearing members 203 may extend from the lens frame 202. For example, the wearing members 203 may extend from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231*c* configured to face the user's body and an outer side surface 231*d* opposite to the inner side surface.

According to various embodiments, the wearable device 200 may include the hinge structures 229 configured to fold the wearing members 203 on the lens frame 202. The hinge structure 229 may be disposed between the lens frame 202 and the wearing member 203. While the wearable device 200 is not worn, the user may fold the wearing members 203 on the lens frame 202 to carry or store the electronic device.

Figure 3:
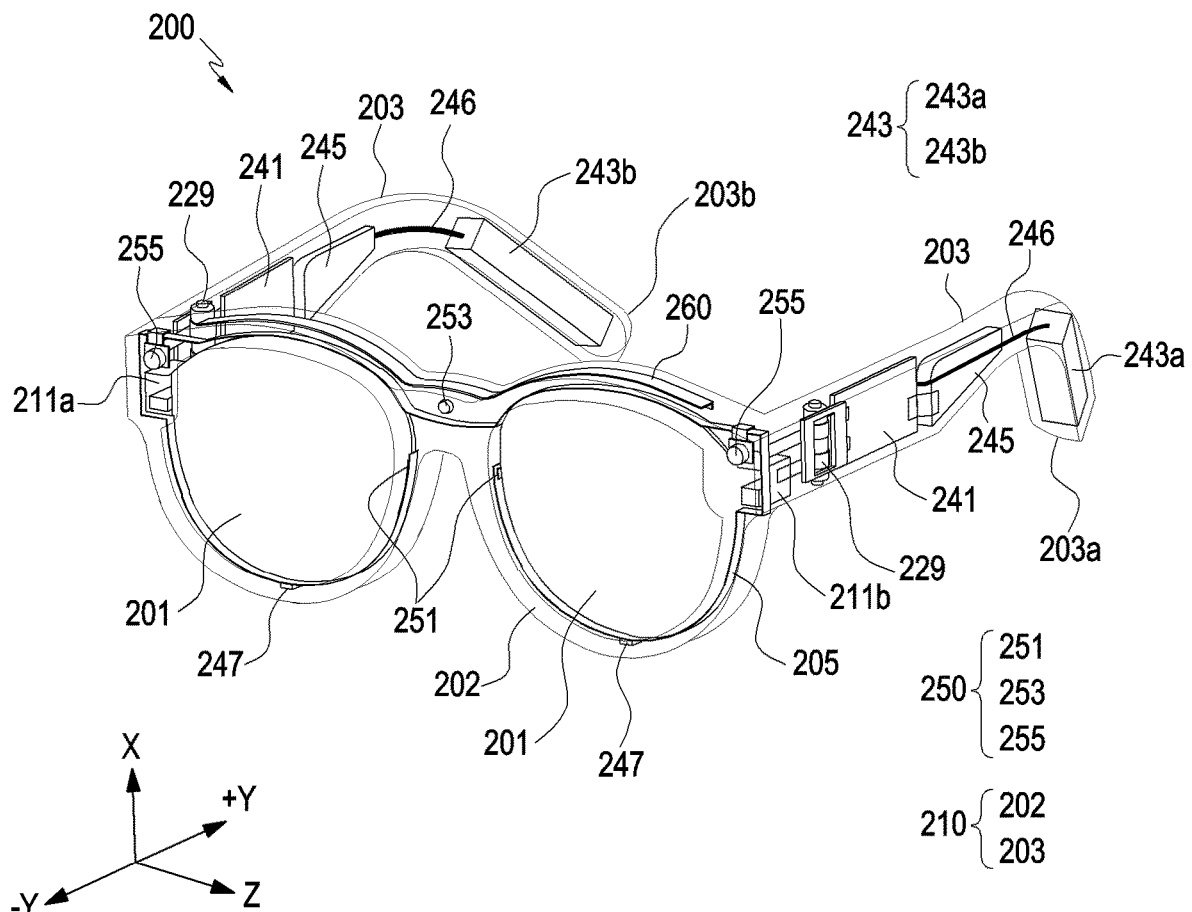
FIG. 3 is a perspective view illustrating an internal configuration of a wearable device according to an embodiment of the disclosure.
Figure 4:
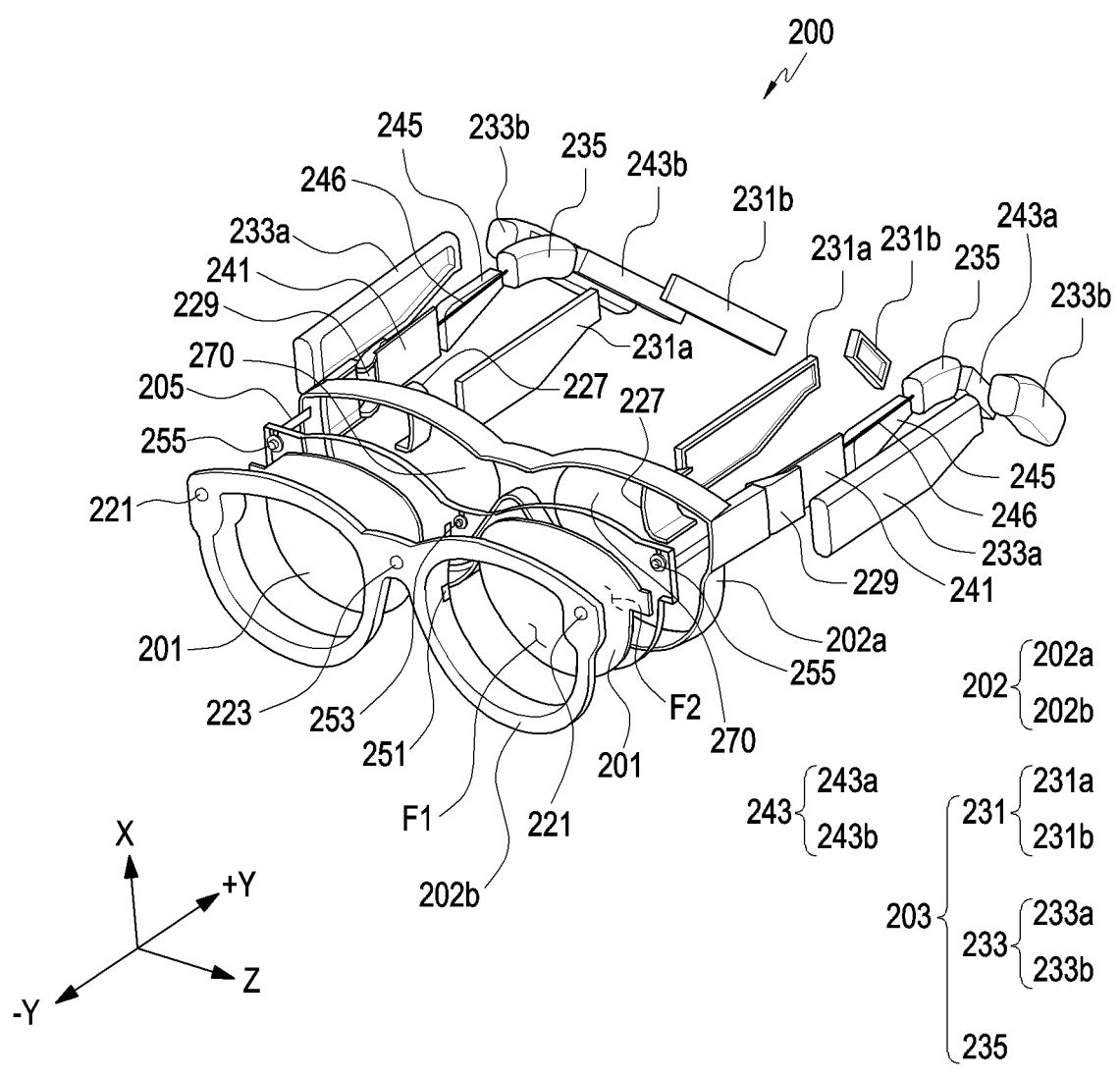
FIG. 4 is an exploded perspective view illustrating a wearable device according to an embodiment of the disclosure.

FIG. 3 is a perspective view illustrating an internal configuration of a wearable device according to an embodiment of the disclosure. FIG. 4 is an exploded perspective view illustrating a wearable device according to an embodiment of the disclosure.

Referring to FIGS. 3 and 4, a wearable device 200 may include components received in the housing 210 (e.g., at least one circuit board 241 (e.g., printed circuit board (PCB), printed board assembly (PBA), flexible PCB, or rigid-flexible PCB (RFPCB)), at least one battery 243, at least one speaker module 245, at least one power transfer structure 246, and a camera module 250). The configuration of the housing 210 of FIG. 3 may be identical in whole or part to the configuration of the display members 201, the lens frame 202, the wearing members 203, and the hinge structures 229 of FIG. 2.

According to various embodiments, the wearable device 200 may obtain and/or recognize a visual image regarding an object or environment in the direction (e.g., −Y direction) in which the wearable device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In another embodiment, the wearable device 200 may provide the received object- or environment-related information, in the form of an audio or visual form, to the user. The wearable device 200 may provide the received object- or environment-related information, in a visual form, to the user through the display members 201, using the display module (e.g., the display module 160 of FIG. 1). For example, the wearable device 200 may implement augmented reality (AR) by implementing the object- or environment-related information in a visual form and combining it with an actual image of the user's surrounding environment.

According to various embodiments, the display member 201 may include a first surface F1 facing in a direction (e.g., −y direction) in which external light is incident and a second surface F2 facing in a direction (e.g., +y direction) opposite to the first surface F1. With the user wearing the wearable device 200, at least a portion of the light or image coming through the first surface F1 may be incident on the user's left eye and/or right eye through the second surface F2 of the display member 201 disposed to face the user's left eye and/or right eye.

According to various embodiments, the lens frame 202 may include at least two or more frames. For example, the lens frame 202 may include a first frame 202a and a second frame 202b. According to an embodiment, when the user wears the wearable device 200, the first frame 202a may be a frame of the portion facing the user's face, and the second frame 202b may be a portion of the lens frame 202 spaced from the first frame 202a in the gazing direction (e.g., –Y direction) in which the user gazes.

According to various embodiments, the light output module 211 (e.g., the first display module 211a and/or the second display module 211b) may provide an image and/or video to the user. For example, the light output module 211 may include a display panel (not shown) capable of outputting images and a lens (not shown) corresponding to the user's eye and guiding images to the display member 201. For example, the user may obtain the image output from the display panel of the light output module 211 through the lens of the light output module 211. According to various embodiments, the light output module 211 may include a device configured to display various information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of an LCD, a DMD, or an LCoS, the wearable device 200 may include a light output module 211 and/or a light source emitting light to the display area of the display member 201. According to another embodiment, when the light output module 211 and/or the display member 201 may include OLEDs or micro LEDs, the wearable device 200 may provide virtual images to the user without a separate light source.

According to various embodiments, at least a portion of the light output module 211 may be disposed in the housing 210. For example, the light output module 211 may be disposed in the wearing member 203 or the lens frame 202 to correspond to each of the user's right eye and left eye. According to an embodiment, the light output module 211 may be connected to the display member 201 and may provide images to the user through the display member 201.

According to various embodiments, the circuit board 241 may include components for driving the wearable device 200. For example, the circuit board 241 may include at least one integrated circuit chip. Further, at least one of the processor 120, the memory 130, the power management module 188, or the communication module 190 of FIG. 1 may be provided in the integrated circuit chip. According to an embodiment, a circuit board 241 may be disposed in the wearing member 203 of the housing 210. According to an embodiment, the circuit board 241 may be electrically connected to the battery 243 through the power transfer structure 246. According to an embodiment, the circuit board 241 may be connected to the flexible printed circuit board 205 and may transfer electrical signals to the electronic components (e.g., the light output module 211, the camera module 250, and the light emitting unit (e.g., the light emitting unit 330 of FIG. 5)) of the electronic device through the flexible printed circuit board 205. According to an embodiment, the circuit board 241 may be a circuit board including an interposer.

According to various embodiments, the flexible printed circuit board 205 may extend from the circuit board 241 through the hinge structure 229 to the inside of the lens frame 202 and may be disposed in at least a portion of the inside of the lens frame 202 around the display member 201.

According to various embodiments, the battery 243 (e.g., the battery 189 of FIG. 1) may be connected with components (e.g., the light output module 211, the circuit board 241, and the speaker module 245, the microphone module 247, and the camera module 250) of the wearable device 200 and may supply power to the components of the wearable device 200.

According to various embodiments, at least a portion of the battery 243 may be disposed in the wearing member 203. According to an embodiment, batteries 243 may be disposed in ends 203a and 203b of the wearing members 203. For example, the batteries 243 may include a first battery 243a disposed in a first end 203a of the wearing member 203 and a second battery 243b disposed in a second end 203b of the wearing member 203.

According to various embodiments, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be located in the wearing member 203 to correspond to the user's ear. For example, the speaker module 245 may be disposed between the circuit board 241 and the battery 243.

According to various embodiments, the power transfer structure 246 may transfer the power from the battery 243 to an electronic component (e.g., the light output module 211) of the wearable device 200. For example, the power transfer structure 246 may be electrically connected to the battery 243 and/or the circuit board 241, and the circuit board 241 may transfer the power received through the power transfer structure 246 to the light output module 211. According to an embodiment, the power transfer structure 246 may be connected to the circuit board 241 through the speaker module 245. For example, when the wearable device 200 is viewed from a side (e.g., in the Z-axis direction), the power transfer structure 246 may at least partially overlap the speaker module 245.

According to various embodiments, the power transfer structure 246 may be a component capable of transferring power. For example, the power transfer structure 246 may include a flexible printed circuit board or wiring. For example, the wiring may include a plurality of cables (not shown). In various embodiments, various changes may be made to the shape of the power transfer structure 246 considering the number and/or type of the cables.

According to various embodiments, the microphone module 247 (e.g., the input module 150 and/or the audio module 170 of FIG. 1) may convert a sound into an electrical signal. According to an embodiment, the microphone module 247 may be disposed in at least a portion of the lens frame 202. For example, at least one microphone module 247 may be disposed on a lower end (e.g., in the –X-axis direction) and/or on an upper end (e.g., in the X-axis direction) of the wearable device 200. According to various embodiments, the wearable device 200 may more clearly recognize the user's voice using voice information (e.g., sound) obtained by the at least one microphone module 247. For example, the wearable device 200 may distinguish the voice information from the ambient noise based on the obtained voice information and/or additional information (e.g., low-frequency vibration of the user's skin and bones). For example, the wearable device 200 may clearly recognize the user's voice and may perform a function of reducing ambient noise (e.g., noise canceling).

According to various embodiments, the camera module 250 may capture a still image and/or a video. The camera module 250 may include at least one of a lens, at least one image sensor, an image signal processor, or a flash. According to an embodiment, the camera module 250 may be disposed in the lens frame 202 and may be disposed around the display member 201.

According to various embodiments, the camera module 250 may include at least one first camera module 251. According to an embodiment, the first camera module 251 may capture the trajectory of the user's eye (e.g., a pupil) or gaze. For example, the first camera module 251 may capture the reflection pattern of the light emitted by the light emitting unit to the user's eyes. For example, the light emitting unit 330 may emit light in an infrared band for tracking the trajectory of the gaze using the first camera module 251. For example, the light emitting unit 330 may include an IR LED. According to an embodiment, the processor (e.g., the processor 120 of FIG. 1) may adjust the position of the virtual image so that the virtual image projected on the display member 201 corresponds to the direction in which the user's pupil gazes. According to an embodiment, the first camera module 251 may include a global shutter (GS)-type camera. It is possible to track the trajectory of the user's eyes or gaze using a plurality of first camera modules 251 having the same specifications and performance.

According to various embodiments, the first camera module 251 may periodically or aperiodically transmit information related to the trajectory of the user's eye or gaze (e.g., trajectory information) to the processor (e.g., the processor 120 of FIG. 1). According to another embodiment, when the first camera module 251 detects a change in the user's gaze based on the trajectory information (e.g., when the user's eyes move more than a reference value with the head positioned still), the first camera module 251 may transmit the trajectory information to the processor.

According to various embodiments, the camera modules 250 may include at least one second camera module 253. According to an embodiment, the second camera module 253 may capture an external image. According to an embodiment, the second camera module 253 may be a global shutter-type or rolling shutter (RS)-type camera. According to an embodiment, the second camera module 253 may capture an external image through the second optical hole 223 formed in the second frame 202b. For example, the second camera module 253 may include a high-resolution color camera, and it may be a high resolution (HR) or photo video (PV) camera. Further, the second camera module 253 may provide an auto-focus (AF) function and an optical image stabilizer (OIS) function.

According to various embodiments, the wearable device 200 may include a flash (not shown) positioned adjacent to the second camera module 253. For example, the flash (not shown) may provide light for increasing brightness (e.g., illuminance) around the wearable device 200 when an external image is obtained by the second camera module 253, thereby reducing difficulty in obtaining an image due to the dark environment, the mixing of various light beams, and/or the reflection of light.

According to various embodiments, the camera modules 250 may include at least one third camera module 255. According to an embodiment, the third camera module 255 may capture the user's motion through a first optical hole 221 formed in the lens frame 202. For example, the third camera module 255 may capture the user's gesture (e.g., hand gesture). Third camera modules 255 and/or first optical holes 221 may be disposed on two opposite sides of the lens frame 202 (e.g., the second frame 202b), e.g., formed in two opposite ends of the lens frame 202 (e.g., the second frame 202b) with respect to the X direction. According to an embodiment, the third camera module 255 may be a global shutter (GS)-type camera. For example, the third camera module 255 may be a camera supporting 3DoF (degrees of freedom) or 6DoF, which may provide position recognition and/or motion recognition in a 360-degree space (e.g., omni-directionally). According to an embodiment, the third camera modules 255 may be stereo cameras and may perform the functions of simultaneous localization and mapping (SLAM) and user motion recognition using a plurality of global shutter-type cameras with the same specifications and performance. According to an embodiment, the third camera module 255 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to an embodiment, at least one of the first camera module 251 or the third camera module 255 may be replaced with a sensor module (e.g., the sensor module 176 of FIG. 1) (e.g., lidar sensor). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules (not shown). For example, the second camera module 253 may include a plurality of lenses (e.g., wide-angle and telephoto lenses) and image sensors and may be disposed on one surface (e.g., a surface facing in the –Y axis) of the wearable device 200. For example, the wearable device 200 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to various embodiments, the processor (e.g., processor 120 of FIG. 1) may determine the motion of the wearable device 200 and/or the user's motion using information for the wearable device 200 obtained using at least one of a gesture sensor, a gyro sensor, or an acceleration sensor of the sensor module (e.g., the sensor module 176 of FIG. 1) and the user's action (e.g., approach of the user's body to the wearable device 200) obtained using the first camera module 251. According to an embodiment, in addition to the above-described sensor, the wearable device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the wearable device 200 and/or the user's motion based on information obtained from the magnetic (geomagnetic) sensor and/or the hall sensor.

According to various embodiments (not shown), the wearable device 200 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 203. The wearable device 200 may control the virtual image output through the display member 201 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to various embodiments, the wearable device 200 may including a reinforcing member 260 that is disposed in an inner space of the lens frame 202 and formed to have a higher rigidity than that of the lens frame 202.

According to various embodiments, the wearable device 200 may include a lens structure 270. The lens structure 270 may refract at least a portion of light. For example, the lens structure 270 may be a prescription lens having a predesignated refractive power. According to an embodiment, the lens structure 270 may be disposed behind (e.g., in the +Y direction) the second window member (e.g., the second window member 430 of FIG. 6) of the display member 201. For example, the lens structure 270 may be positioned between the display member 201 and the user's eye. For example, the lens structure 270 may face one surface (e.g., the second outer surface 430b of FIG. 6) of the display member (e.g., the display member 400 of FIG. 6).

According to various embodiments, the housing 210 may include a hinge cover 227 that may conceal a portion of the hinge structure 229. Another part of the hinge structure 229 may be received or hidden between an inner case 231 and an outer case 233, which are described below.

According to various embodiments, the wearing member 203 may include the inner case 231 and the outer case 233. The inner case 231 may be, e.g., a case configured to face the user's body or directly contact the user's body, and may be formed of a material having low thermal conductivity, e.g., a synthetic resin. According to an embodiment, the inner case 231 may include an inner side surface (e.g., the inner side surface 231c of FIG. 2) facing the user's body. The outer case 233 may include, e.g., a material (e.g., a metal) capable of at least partially transferring heat and may be coupled to the inner case 231 to face each other. According to an embodiment, the outer case 233 may include an outer side surface (e.g., the outer side surface 231d of FIG. 2) opposite to the inner side surface 331c. In an embodiment, at least one of the circuit board 241 or the speaker module 245 may be received in a space separated from the battery 243 in the wearing member 203. In the illustrated embodiment, the inner case 231 may include a first case 231a including the circuit board 241 or the speaker module 245 and a second case 231b receiving the battery 243, and the outer case 233 may include a third case 233a coupled to face the first case 231a and a fourth case 233b coupled to face the second case 231b. For example, the first case 231a and the third case 233a may be coupled (hereinafter, 'first case portions 231a and 233a') to receive the circuit board 241 and/or the speaker module 245, and the second case 231b and the fourth case 233b may be coupled (hereinafter, 'second case portions 231b and 233b') to receive the battery 343.

According to various embodiments, the first case portions 231a and 233a may be rotatably coupled to the lens frame 202 through the hinge structure 229, and the second case portion 231b and fourth case portion 233b may be connected or mounted to the ends of the first case portion 231a and third case portion 233a through the connecting member 235. In some embodiments, a portion of the connecting member 235 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 241 or the battery 243, the connecting member 235 may block heat transfer to the portion in contact with the user's body while dissipating or discharging heat through the portion not in contact with the user's body. According to an embodiment, a portion of the connecting member 235 configured to come into contact with the user's body may be interpreted as a portion of the inner case 231, and a portion of the connecting member 235 that does not come into contact with the user's body may be interpreted as a portion of the outer case 233. According to an embodiment (not shown), the first case 231a and the second case 231b may be integrally configured without the connecting member 235, and the third case 233a and the fourth case 233b may be integrally configured without the connecting member 235. According to various embodiments, other components (e.g., the antenna module 197 of FIG. 1) than the illustrated components may be included. The communication module 190 may be used to receive information regarding things or environment from an external electronic device (e.g., the electronic device 102 or 104 or server 108 of FIG. 1) via a network (e.g., the first network 198 or second network 199 of FIG. 1).

Although only the wearable device 200 is illustrated and described in FIGS. 2 to 4, the disclosure is not limited thereto, and some components of the wearable device 200 illustrated in FIGS. 2 to 4 may be included in electronic devices, such as smartphones and tablet PCs.

Figure 5:
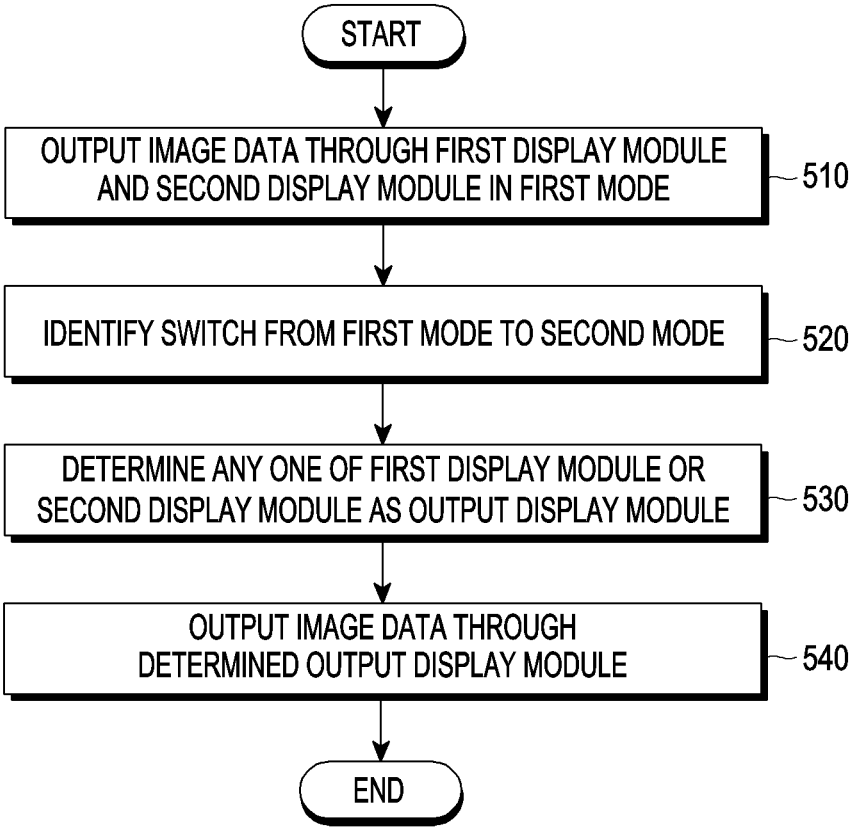
FIG. 5 is a view illustrating a function or operation of outputting image data through an output display module determined according to a mode switch of a wearable device according to an embodiment of the disclosure.

FIG. 5 is a view illustrating a function or operation of outputting image data through an output display module determined according to a mode switch of a wearable device 200 according to an embodiment of the disclosure.

Referring to FIG. 5, the wearable device 200 (e.g., the electronic device 101 of FIG. 1) according to an embodiment of the disclosure may output image data through the first display module 211a and the second display module 211b in the first mode in operation 510. The "first mode" mentioned in the disclosure may mean a mode (e.g., function or operation) of outputting image data (e.g., RGB data) for providing a virtual object to the user through the first display module 211a and the second display module 211b. In the first mode according to an embodiment of the disclosure, a depth camera included in the wearable device 200 may be activated. The "second mode" mentioned in the disclosure may mean a mode (e.g., function or operation) of outputting image data (e.g., RGB data) for providing a virtual object to the user through any one of the first display module 211a or the second display module 211b. In the second mode according to an embodiment of the disclosure, the depth camera included in the wearable device 200 may not be activated. In order to minimize current consumption, the wearable device 200 according to an embodiment of the disclosure may turn off at least one camera (e.g., the third camera module 255) in the second mode and display the virtual object based on a 3 degrees of freedom (DoF) coordinate system. More specifically, the virtual object may be displayed in a designated depth area, and may be displayed at a fixed position centered on the user. Further, wearable device 200 according to an embodiment of the disclosure may be changed to perform a minimum function by reducing the frames per second (FPS) of at least one camera (e.g., gaze tracking camera). The gaze tracking camera according to an embodiment of the disclosure may be driven to perform a minimum operation to identify the user's fatigue because the virtual object is displayed in the fixed area in the second mode (e.g., operates at 90 FPS for pupil position tracking in the first mode, and at 30 FPS for identifying fatigue in the second mode).

Figure 6:
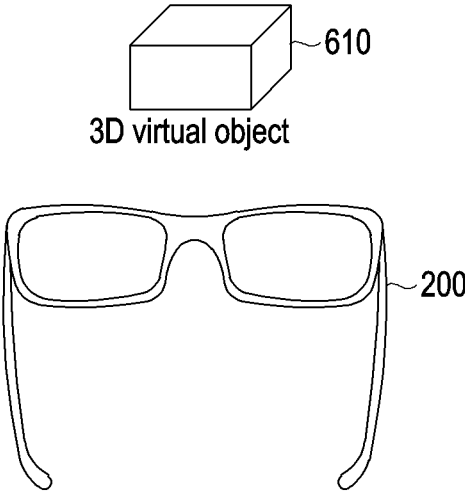
FIG. 6 is a view illustrating a function or operation of outputting image data in a first mode by a wearable device according to an embodiment of the disclosure.

FIG. 6 is a view illustrating a function or operation of outputting image data in a first mode by a wearable device 200 according to an embodiment of the disclosure.

Referring to FIG. 6, the wearable device 200 according to an embodiment of the disclosure may provide a three-dimensional virtual object to the user by outputting image data through the first display module 211a and the second display module 211b.

The wearable device 200 (e.g., the electronic device 101 of FIG. 1) according to an embodiment of the disclosure may identify a switch from the first mode to the second mode in operation 520. The wearable device 200 according to an embodiment of the disclosure may identify the switch from the first mode to the second mode by obtaining the user's switching command (e.g., a switching command to a low power mode). The wearable device 200 according to an embodiment of the disclosure may switch from the first mode to the second mode based on at least one of the remaining battery capacity of the wearable device 200, the heat generation state of the wearable device 200, the type of the notification generated for the wearable device 200, the type (e.g., SMS application or call application) of the application corresponding to the notification (e.g., reception of a text message or generation of a receiving call) generated for the wearable device 200, whether the wearable device 200 is moved (e.g., whether the moving speed of the wearable device 200 exceeds a threshold speed), and the user's visual fatigue of the wearable device 200, although there is no switching command from the user. In order to measure the user's visual fatigue of the wearable device 200, the wearable device according to an embodiment of the disclosure may track the user's eye blinking, the user's eye pupil control speed, the user's eye dryness, the degree of hyperemia, and/or nystagmus information with a gaze tracking camera (e.g., as visual fatigue increases, eye blinking increases and pupil control speed decreases). Alternatively, the wearable device 200 according to an embodiment of the disclosure may collect biometric information such as electrocardiogram and/or brain waves through a separate sensor to measure visual fatigue and use it to determine visual fatigue.

Figure 7:
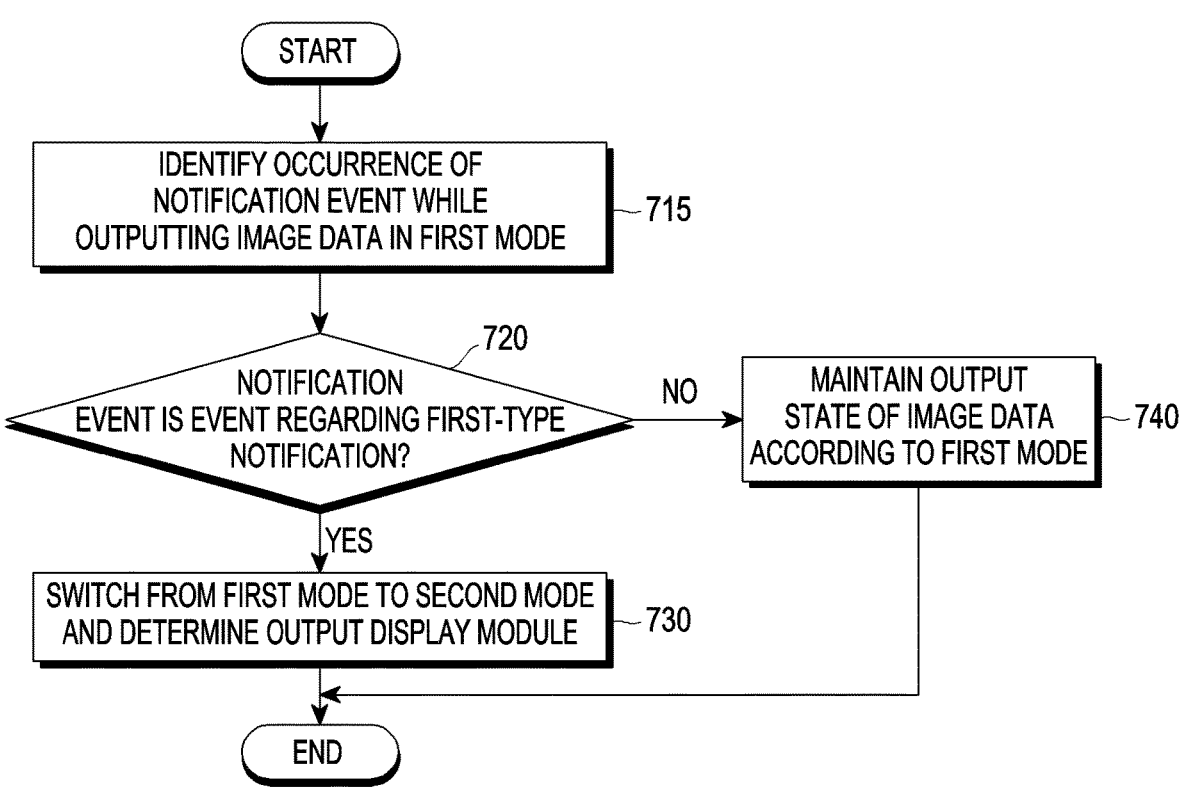
FIG. 7 is a view illustrating a function or operation of switching a mode according to a type of a notification corresponding to a generated notification event by a wearable device according to an embodiment of the disclosure.
Figure 8:
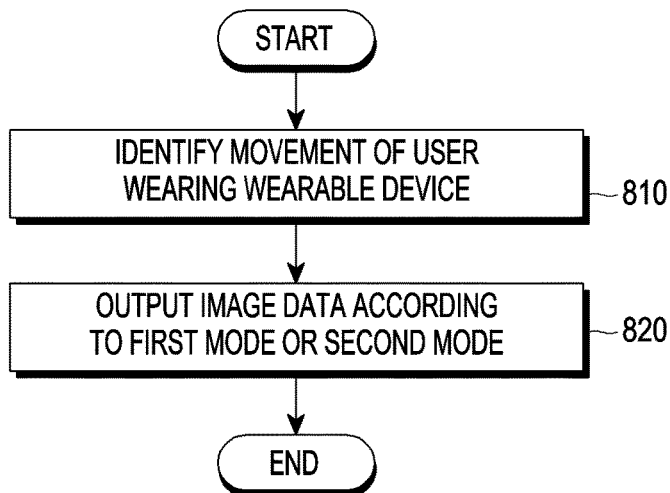
FIGS. 8 and 9 are views illustrating a function or operation of switching a mode based on a moving speed of a wearable device, by the wearable device according to various embodiments of the disclosure.
Figure 9:
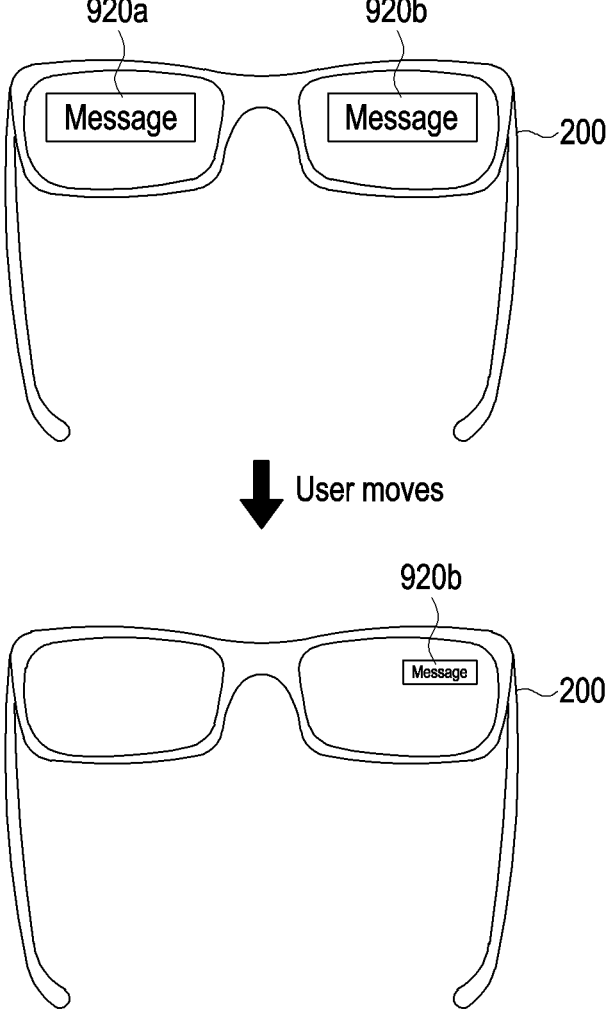

FIG. 7 is a view illustrating a function or operation of switching a mode according to a type of a notification corresponding to a generated notification event by a wearable device 200 according to an embodiment of the disclosure. FIGS. 8 and 9 are views illustrating a function or operation of switching a mode based on a moving speed of a wearable device 200, by the wearable device 200 according to various embodiments of the disclosure.

Referring to FIG. 7, the wearable device 200 according to an embodiment of the disclosure may identify the occurrence of an event in operation 715. The event according to an embodiment of the disclosure may be automatically identified (e.g., without obtaining a command from the user) according to the current status (e.g., the battery status, the communication environment, etc.) of the wearable device 200. Alternatively, a notification event according to an embodiment of the disclosure may be identified based on obtaining the user's command (e.g., the user's command to display time information). The event according to an embodiment of the disclosure may include at least one notification event of an event (e.g., an SMS reception event) indicating that a notification transmitted from an external electronic device (e.g., a server, etc.) occurs or a notification event (e.g., a notification event indicating the battery status) occurring according to the current status of the wearable device 200. According to an embodiment of the disclosure, the identification of the occurrence of the notification event may be performed while the image data is output in the first mode, or may be performed while in a standby state (e.g., in a sleep state in which no image data is output through the display module). According to an embodiment of the disclosure, when identifying the occurrence of a notification event in the standby state, it may be understood by one of ordinary skill in the art that operation 720 is a function or operation performed for the wearable device 200 to operate in the first mode or the second mode.

In operation 720, the wearable device 200 according to an embodiment of the disclosure may determine whether the event is an event related to a first-type notification. The first-type notification according to an embodiment of the disclosure may mean a notification type for switching the operation mode of the wearable device 200 from the first mode to the second mode. The first-type notification according to an embodiment of the disclosure is a notification for displaying, e.g., a designated text and/or a designated icon, and may include, e.g., at least one of an SMS message reception notification, a remaining battery level notification, heat generation-related parameter display notification, a communication-related parameter display notification, and/or a time display notification. As described above, according to an embodiment of the disclosure, the first-type notification is a notification for displaying only a simple icon and/or text, and since the need to display a virtual object in a form having a spatial sense is low, the wearable device 200 may operate in the second mode. The first-type notification according to an embodiment of the disclosure may be previously designated or designated by the user.

In operation 730, when the event is an event related to a first-type notification, the wearable device 200 according to an embodiment of the disclosure may switch from the first mode to the second mode and determine the output display module. The function or operation of determining the output display module according to an embodiment of the disclosure is described below with reference to operation 530. In operation 740, when the notification event is not an event related to the first-type notification, the wearable device 200 according to an embodiment of the disclosure may maintain the output state of image data according to the first mode. According to an embodiment of the disclosure, when identifying the occurrence of a notification event in the standby state, operation 730 may be replaced with a function or operation of controlling the display module according to the first mode or the second mode.

Referring to FIG. 8, in operation 810, the wearable device 200 according to an embodiment of the disclosure may identify a movement of the user wearing the wearable device 200 while outputting image data in the first mode. For example, the wearable device 200 according to an embodiment of the disclosure may determine whether the moving speed of the wearable device 200 exceeds a threshold speed. The wearable device 200 according to an embodiment of the disclosure may identify the movement (e.g., moving speed) of the wearable device 200 using various sensors (e.g., inertial measurement unit (IMU) sensor, acceleration sensor, and/or gyro sensor, GPS, camera, etc.) included in the wearable device 200.

In operation 820, the wearable device 200 according to an embodiment of the disclosure may determine the output display module according to the first mode or the second mode. For example, the wearable device 200 according to an embodiment of the disclosure may determine the output display module to output image data according to the second mode when the movement of the user wearing the wearable device 200 is identified. The description of operation 530 may be equally applied to the function or operation of determining the output display module according to an embodiment of the disclosure.

According to various embodiments of the disclosure, when the wearable device 200 is configured to determine the operation mode (e.g., the first mode or the second mode) according to the moving speed of the user wearing the wearable device 200, the wearable device 200 according to an embodiment of the disclosure may further include a function or operation of determining whether the moving speed of the user wearing the wearable device 200 exceeds the threshold speed. The threshold speed according to an embodiment of the disclosure may be previously designated or may be determined by the user's input. The threshold speed according to an embodiment of the disclosure may be a speed for switching the operation mode of the wearable device 200 from the first mode to the second mode. When the moving speed of the user wearing the wearable device 200 according to an embodiment of the disclosure exceeds the threshold speed, as shown in FIG. 9, the virtual object may be displayed using only image data (e.g., the second image data 920*b*) output by the second display module 211*b*. In this case, the virtual object according to an embodiment of the disclosure may be viewed to the user as a two-dimensional image. When the moving speed of the user wearing the wearable device 200 according to an embodiment of the disclosure does not exceed the threshold speed, as shown in FIG. 9, the virtual object may be displayed using image data (e.g., first image data 920*a* and second image data 920*b*) output by each of the first display module 211*a* and the second display module 211*b*. In this case, the virtual object according to an embodiment of the disclosure may be viewed to the user as a three-dimensional image.

The wearable device 200 according to an embodiment of the disclosure may provide the virtual object to the user through the first mode or the second mode according to the user's setting. For example, various applications that provide AR content may be designed to provide the virtual object to the user through the first mode or the second mode. The wearable device 200 according to an embodiment of the disclosure may identify the user's setting and provide the virtual object (e.g., AR content) in the first mode or the second mode. For example, in the case of an AR navigation application, if the identified operation mode is the first mode, a real-world external road may be identified, and the moving direction of a vehicle may be displayed on the real-world road. Alternatively, when the identified operation mode is the second mode, the wearable device 200 according to an embodiment of the disclosure may provide a notification of vehicle movement information in a card method, and in this case, the corresponding information may be provided to the user through a single display module. The card method according to an embodiment of the disclosure may refer to a method of displaying road information (e.g., traffic congestion section, construction section, etc.) and/or driving information (e.g., vehicle moving speed, planned direction, etc.) in a square shape at a predetermined location rather than a method of displaying the vehicle movement direction on the real-world road.

The wearable device 200 according to an embodiment of the disclosure may identify whether an application currently being executed or to be executed (e.g., when an application execution request is obtained from the user) is an application configured to operate in the first mode (e.g., a navigation application) or an application configured to operate in the second mode (e.g., an SMS application). When the application currently being executed or to be executed (e.g., when an application execution request is obtained from the user) is an application configured to operate in the first mode (e.g., a navigation application), the wearable device 200 according to an embodiment of the disclosure may display the execution screen of the application (e.g., a navigation application) as the virtual object 610 according to the first mode. When the application currently being executed or to be executed (e.g., when an application execution request is obtained from the user) is an application configured to operate in the second mode (e.g., an SMS application), the wearable device 200 according to an embodiment of the disclosure may display the execution screen of the application (e.g., a navigation application) as the virtual object 610 according to the second mode.

The wearable device 200 (e.g., the electronic device 101 of FIG. 1) according to an embodiment of the disclosure may determine any one of the first display module 211*a* and the second display module 211*b* as an output display module in operation 530. The wearable device 200 according to an embodiment of the disclosure may determine the use frequency of the first display module 211*a* and the second display module 211*b*, and determine any one of the first display module 211*a* and the second display module 211*b* as an output display module based on the determined use frequency. According to an embodiment of the disclosure, when the use frequencies of the first display module 211*a* and the second display module 211*b* are similar to each other, the lifespan of each display module may be maintained substantially the same. Alternatively, the wearable device 200 according to an embodiment of the disclosure may determine any one of the first display module 211*a* and the second display module 211*b* as an output display module based on the position of the dominant eye and/or visual fatigue.

Figure 10:
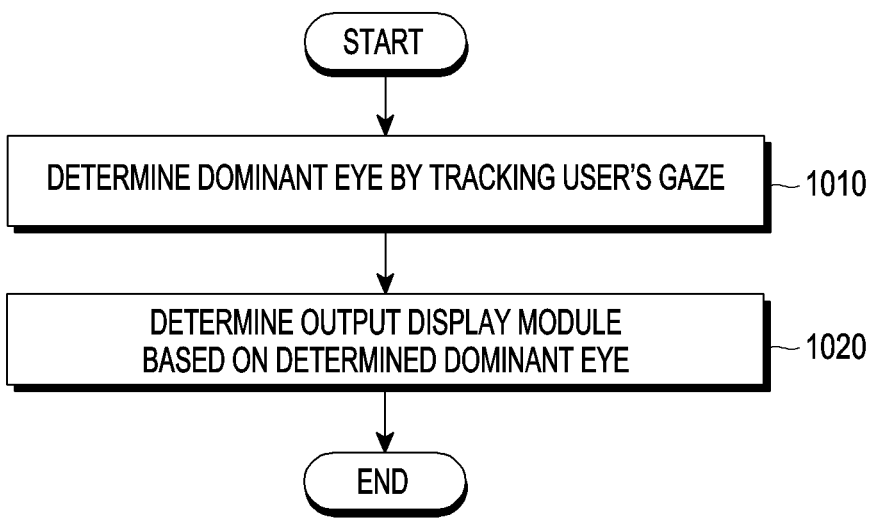
FIGS. 10, 11A, and 11B are views illustrating a function or operation of determining a dominant eye and determining an output display module according to the determined dominant eye by a wearable device according to various embodiments of the disclosure.
Figure 11A:
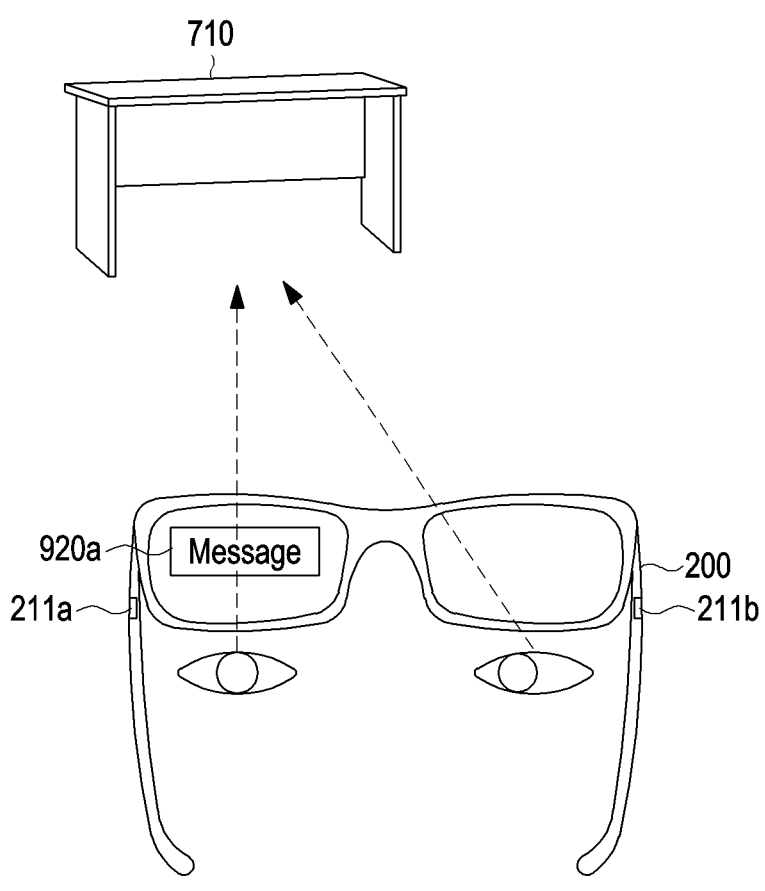
Figure 11B:
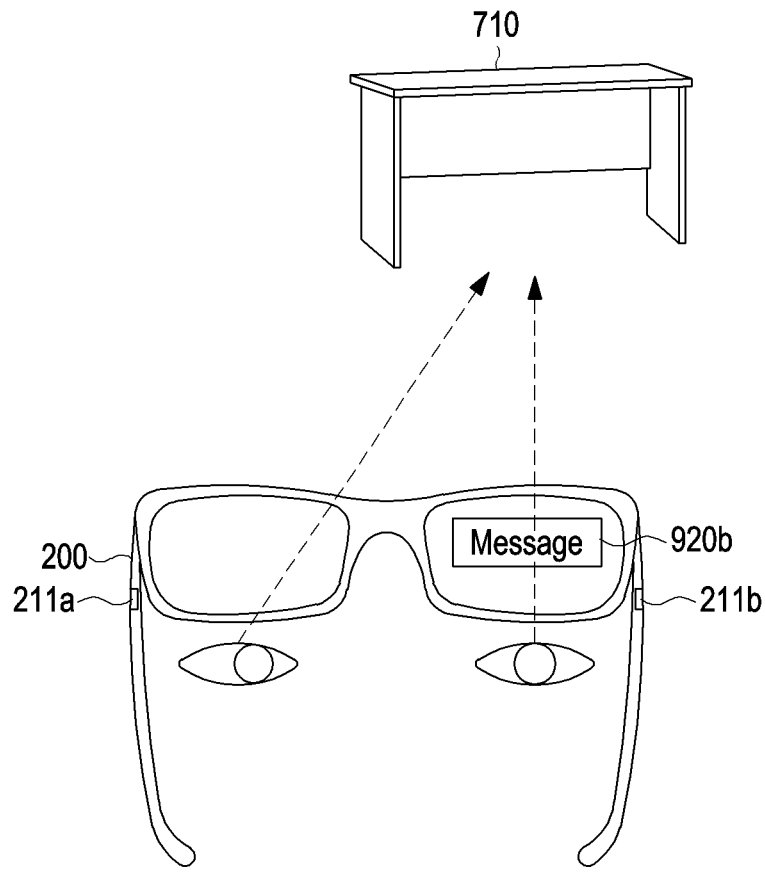

FIGS. 10, 11A, and 11B are views illustrating a function or operation of determining a dominant eye and determining an output display module according to the determined dominant eye by a wearable device according to various embodiments of the disclosure.

Referring to FIGS. 10, 11A, and 11B, in operation 1010, the wearable device 200 according to an embodiment of the disclosure may determine the dominant eye by tracking the user's gaze. As shown in FIG. 11A, the wearable device 200 according to an embodiment of the disclosure may identify through a gaze tracking camera whether the pupil faces the front or is skewed to either side in order to look at the real object 710. The wearable device 200 according to an embodiment of the disclosure may determine the eye with the pupil facing the front as the dominant eye. For example, in the case of FIG. 11A, the left eye may be determined as the dominant eye, and in the case of FIG. 11B, the right eye may be determined as the dominant eye. According to another embodiment of the disclosure, when it is determined that the user's gazes (e.g., the positions of the pupils) are facing the center, any one predesignated display module may be determined as the output display module.

In operation 1020, the wearable device 200 according to an embodiment of the disclosure may determine an output display module based on the determined dominant eye. The wearable device 200 according to an embodiment of the disclosure may determine the display module corresponding to the direction of the dominant eye as the output display module. For example, referring to FIG. 11A, the wearable device 200 according to an embodiment of the disclosure may determine the first display module 211a as the output display module and output the image data (e.g., the first image data 920a) when the left eye is determined as the dominant eye. Referring to FIG. 11B, the wearable device 200 according to an embodiment of the disclosure may determine the second display module 211b as the output display module and output the image data (e.g., the second image data 920b) when the right eye is determined as the dominant eye.

The wearable device 200 according to an embodiment of the disclosure may output image data through the determined output display module in operation 540. The virtual object according to an embodiment of the disclosure may be viewed to the user as a two-dimensional image. The wearable device 200 according to an embodiment of the disclosure may control the output display module so that even at least one virtual object which was shown before the mode switch is changed in display format according to the mode switch and shown to the user. For example, at least one three-dimensional virtual object that was being shown to the user in connection with the real object 710 may be shown to the user as a two-dimensional virtual object when the operation mode of the wearable device 200 switches from the first mode to the second mode.

Figure 12:
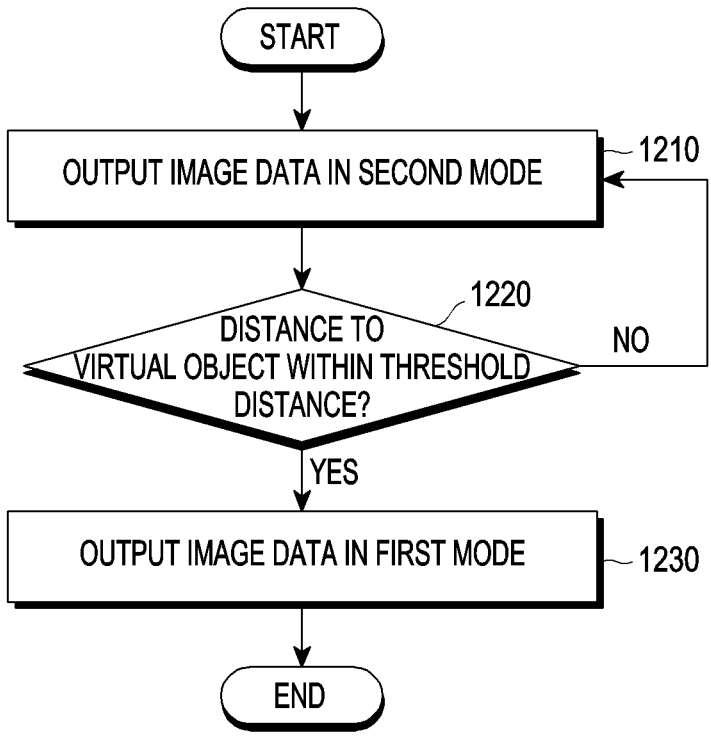
FIGS. 12, 13A, and 13B are views illustrating a function or operation of switching a mode when a distance between a wearable device and a virtual object or actual object is within a threshold distance according to various embodiments of the disclosure.
Figure 13A:
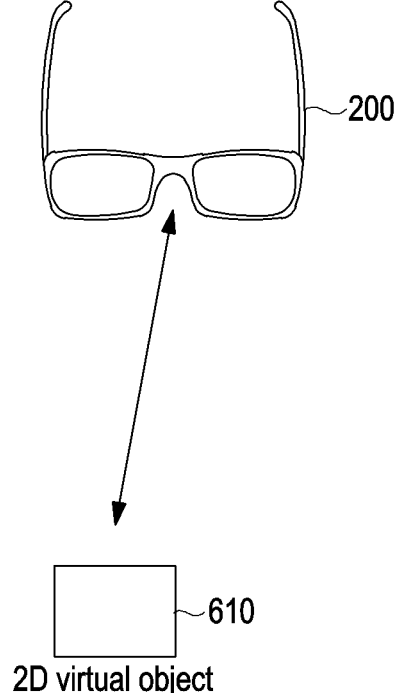
Figure 13B:
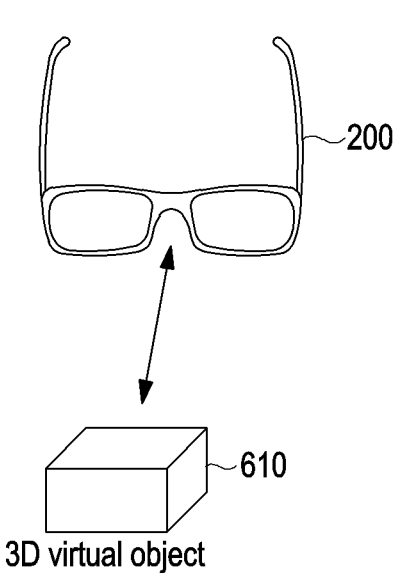

FIGS. 12, 13A, and 13B are views illustrating a function or operation of switching a mode when a distance between a wearable device 200 and a virtual object 610 is within a threshold distance according to various embodiments of the disclosure.

Referring to FIGS. 12, 13A, and 13B, the wearable device 200 according to an embodiment of the disclosure may output image data in the second mode in operation 1210. The wearable device 200 according to an embodiment of the disclosure may output image data for providing the virtual object 610 to the user through the first display module 211a or the second display module 211b. In this case, the virtual object 610 according to an embodiment of the disclosure may be shown to the user as a two-dimensional image, as shown in FIG. 13A.

In operation 1220, the wearable device 200 according to an embodiment of the disclosure may determine whether the distance to the virtual object 610 is within a threshold distance. Since information about the location where the virtual object 610 is expressed in the real world is known, the wearable device 200 according to an embodiment of the disclosure may determine whether the distance between the wearable device 200 and the virtual object 610 increases or decreases. According to another embodiment of the disclosure, the wearable device 200 may be configured to switch a mode when the distance to the real object 710 is within threshold distance. In this case, operation 1220 may be replaced with a function or operation of determining whether the distance to the real object 710 is within the threshold distance. In this case, the real object according to an embodiment of the disclosure may include an object related to the virtual object (e.g., when the real object is a desk, the virtual object is an object that displays the price of the desk). According to another embodiment of the disclosure, the wearable device 200 may be configured to switch a mode when a user gesture is detected. The user gesture according to an embodiment of the disclosure may include a gesture indicating a specific real object 710 by hand or a state in which the user's gaze direction gazes at a specific real object 710 for a predetermined time or longer. In this case, the wearable device 200 according to an embodiment of the disclosure may operate according to the first mode.

In operation 1230, the wearable device 200 according to an embodiment of the disclosure may output image data in the first mode when the distance to the virtual object 610 is within the threshold distance. In this case, the virtual object 610 according to an embodiment of the disclosure may be shown to the user as a three-dimensional image, as shown in FIG. 13B.

Figure 14:
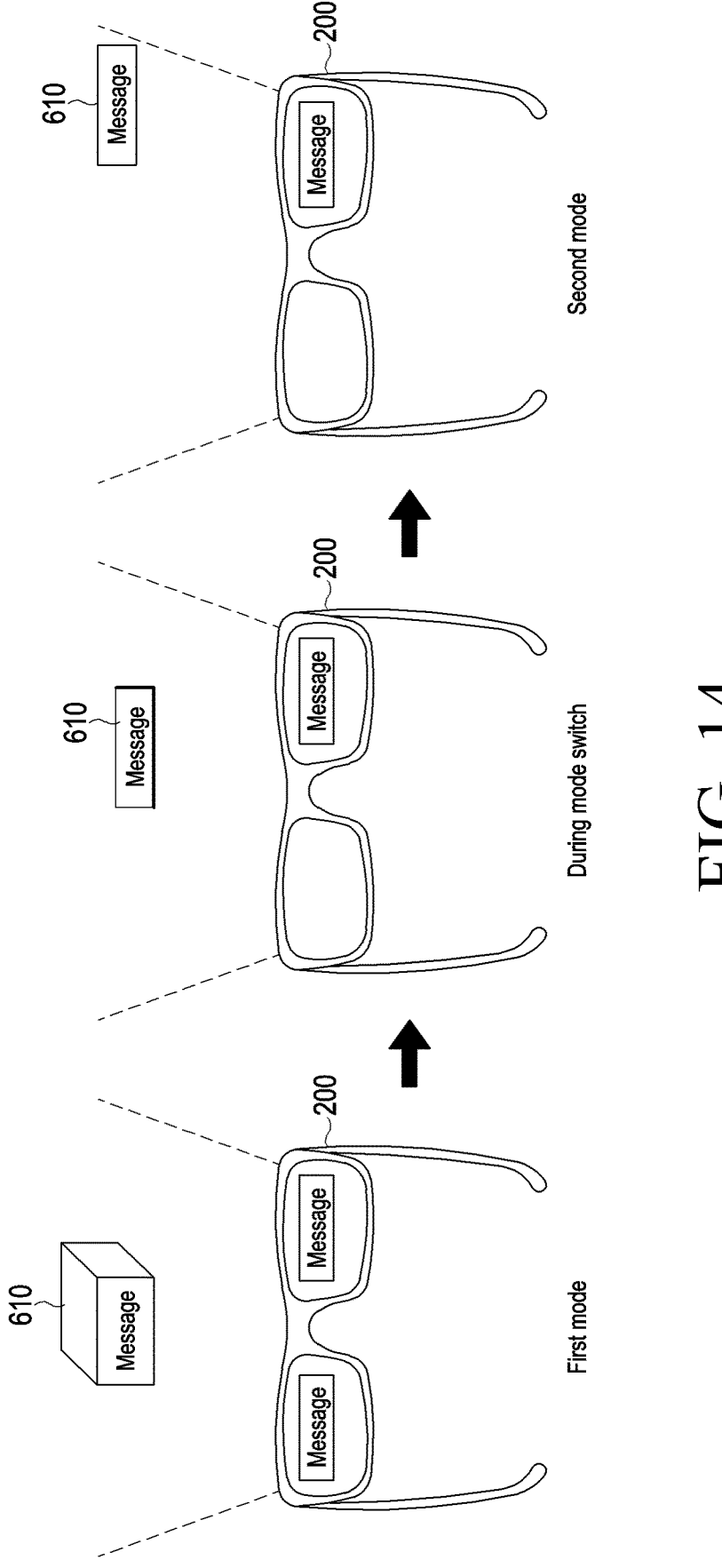
FIG. 14 is a view illustrating a function or operation of providing a visual effect for a virtual object for a seamless switch of a virtual object while the wearable device switches a mode according to an embodiment of the disclosure.

FIG. 14 is a view illustrating a function or operation of providing a visual effect for a virtual object 610 for a seamless switch of a virtual object 610 while the wearable device 200 switches a mode according to an embodiment of the disclosure.

Referring to FIG. 14, when switching from the first mode to the second mode, the size and/or position of the virtual object 610 may be changed. The wearable device 200 according to an embodiment of the disclosure may provide an image of an intermediate form (e.g., size, position, and/or three-dimensional effect) between a three-dimensional image and a two-dimensional image through the activated display (e.g., the output display module) in order to provide a seamless user experience to the user when switching the mode.

Figure 15:
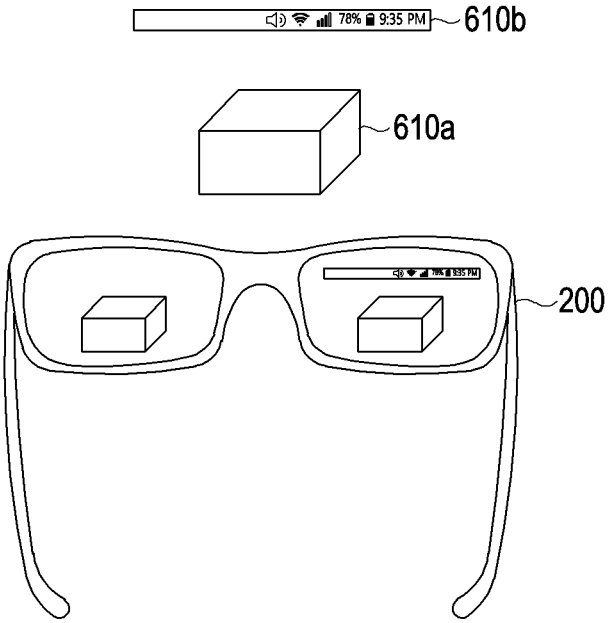
FIG. 15 is a view illustrating a function or operation of displaying some of a plurality of virtual objects according to a first mode and displaying other some according to a second mode when the plurality of virtual objects are displayed according to an embodiment of the disclosure.

FIG. 15 is a view illustrating a function or operation of displaying some (e.g., the first virtual object 610a) of a plurality of virtual objects (e.g., the first virtual object 610a and the second virtual object 610b) according to a first mode and displaying other some (e.g., the second virtual object 610b) according to a second mode when the plurality of virtual objects (e.g., the first virtual object 610a and the second virtual object 610b) are displayed according to an embodiment of the disclosure.

Referring to FIG. 15, the wearable device 200 according to an embodiment of the disclosure may display the plurality of virtual objects (e.g., the first virtual object 610a and the second virtual object 610b). In this case, content (e.g., a status bar, SMS notification, etc. of the wearable device 200 as a first-type notification) designated to be displayed according to the second mode may output image data through any one output display module (e.g., the second display module 211b) of the display modules (e.g., the first display module 211a and the second display module 211b). Further, content designated to be displayed according to the first mode (e.g., not the first-type notification) may output image data through the display module (e.g., the first display module 211a and the second display module 211b).

A wearable device 200 according to an embodiment of the disclosure may comprise a first display module 211a, a second display module 211b, and at least one processor 120. The at least one processor may be configured to output image data through the first display module and the second display module in a first mode, identify a switch from the first mode to a second mode, and in the second mode, determine any one of the first display module or the second display module as an output display module, and control the output display module to output the image data through the determined output display module.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
a first display module;
a second display module;
memory storing one or more computer programs; and
one or more processors communicatively coupled to the first display module, the second display module, and the memory,
wherein the one or more computer programs include computer-executable instructions that, when executed by the one or more processors individually or collectively, cause the wearable device to:
output image data through the first display module and the second display module in a first mode,
switch from the first mode to a second mode based on at least one of an occurrence of a notification event, a moving speed of the wearable device, or a type of an application executing on the wearable device,
determine any one of the first display module or the second display module as an output display module in the second mode, and
control the output display module to output the image data through the determined output display module,
wherein in the first mode, the image data is displayed as a three-dimensional virtual object by using the first display module to display the image data to a first eye of a user and the second display module to display the image data to a second eye of the user, and
wherein in the second mode, the image data is displayed as a two-dimensional virtual object by using any one of the first display module or the second display module to display the image data to a single eye of the user, the second mode configured to conserve power of the wearable device.

2. The wearable device of claim 1, further comprising:
at least one depth sensor,
wherein the one or more computer programs further include computer-executable instructions that, when executed by the one or more processors individually or collectively, cause the wearable device to:
control the at least one depth sensor to activate a depth measurement function of the at least one depth sensor in the first mode, and
control the at least one depth sensor to deactivate a sensing function of the at least one depth sensor in the second mode.

3. The wearable device of claim 1, wherein the one or more computer programs further include computer-executable instructions that, when executed by the one or more processors individually or collectively, cause the wearable device to determine any one of the first display module or the second display module as the output display module based on at least one of a use frequency of the first display module and the second display module, a position of a dominant eye of a user wearing the wearable device, or a degree of a visual fatigue.

4. The wearable device of claim 1, wherein the one or more computer programs further include computer-executable instructions that, when executed by the one or more processors individually or collectively, cause the wearable device to:
identify the moving speed of the wearable device while outputting the image data in the first mode; and determine whether a threshold speed for switching from the first mode to the second mode is exceeded.

5. The wearable device of claim 4, wherein the one or more computer programs further include computer-executable instructions that, when executed by the one or more processors individually or collectively, cause the wearable device to, when the moving speed of the wearable device exceeds the threshold speed, switch from the first mode to the second mode and output the image data.

6. The wearable device of claim 1, wherein the one or more computer programs further include computer-executable instructions that, when executed by the one or more processors individually or collectively, cause the wearable device to identify the type of the application executing on the wearable device and control the wearable device to operate in the first mode or the second mode based on the identified type of the application.

7. The wearable device of claim 1, wherein the one or more computer programs further include computer-executable instructions that, when executed by the one or more processors individually or collectively, cause the wearable device to identify a type of an application corresponding to the notification event and switch from the first mode to the second mode based on the identified type of the application.

8. The wearable device of claim 1, wherein the one or more computer programs further include computer-executable instructions that, when executed by the one or more processors individually or collectively, cause the wearable device to identify whether a distance from a virtual object or a real object is within a threshold distance or a user gesture is detected while outputting the image data in the second mode.

9. The wearable device of claim 8, wherein the one or more computer programs further include computer-executable instructions that, when executed by the one or more processors individually or collectively, cause the wearable device to switch to the first mode and output the image data based on being within the threshold distance or detection of the user gesture.

10. The wearable device of claim 1, wherein the one or more computer programs further include computer-executable instructions that, when executed by the one or more processors individually or collectively, cause the wearable device to control the output display module to provide a visual effect for a seamless switch for a virtual object shown to a user according to the output of the image data while an operation mode of the wearable device is switched.

11. A method for controlling a wearable device, the method comprising:
outputting image data through a first display module of the wearable device and a second display module of the wearable device in a first mode;
switching from the first mode to a second mode based on at least one of an occurrence of a notification event, a moving speed of the wearable device, or a type of an application executing on the wearable device;
determining any one of the first display module or the second display module as an output display module in the second mode; and
controlling the output display module to output the image data through the determined output display module,
wherein in the first mode, the image data is displayed as a three-dimensional virtual object by using the first display module to display the image data to a first eye of a user and the second display module to display the image data to a second eye of the user, and wherein in the second mode, the image data is displayed as a two-dimensional virtual object by using any one of the first display module or the second display module to display the image data to a single eye of the user, the second mode configured to conserve power of the wearable device.

12. The method of claim 11, wherein the wearable device further includes at least one depth sensor, and wherein the method for controlling the wearable device further comprises controlling the at least one depth sensor to activate a depth measurement function of the at least one depth sensor in the first mode and controlling the at least one depth sensor to deactivate a sensing function of the at least one depth sensor in the second mode.

13. The method of claim 11, further comprising determining any one of the first display module or the second display module as the output display module based on at least one of a use frequency of the first display module and the second display module, a position of a dominant eye of a user wearing the wearable device, or a degree of a visual fatigue.

14. The method of claim 11, further comprising:

identifying the moving speed of the wearable device while outputting the image data in the first mode; and determining whether a threshold speed for switching from the first mode to the second mode is exceeded.

15. The method of claim 14, further comprising, when the moving speed of the wearable device exceeds the threshold speed, switching from the first mode to the second mode and outputting the image data.

16. The method of claim 11, further comprising:

identifying the type of the application executing on the wearable device; and controlling the wearable device to operate in the first mode or the second mode based on the identified type of the application.

17. The method of claim 11, further comprising identifying a type of an application corresponding to the notification event and switching from the first mode to the second mode based on the identified type of the application.

18. The method of claim 11, further comprising identifying whether a distance from a virtual object or a real object is within a threshold distance or a user gesture is detected while outputting the image data in the second mode.

19. One or more non-transitory computer-readable storage media storing one or more computer programs including computer-executable instructions that, when executed by one or more processors of a wearable device individually or collectively, cause the wearable device to perform operations, the operations comprising:

outputting image data through a first display module of the wearable device and a second display module of the wearable device in a first mode;

switching from the first mode to a second mode based on at least one of an occurrence of a notification event, a moving speed of the wearable device, or a type of an application executing on the wearable device;

determining any one of the first display module or the second display module as an output display module in the second mode; and controlling the output display module to output the image data through the determined output display module, wherein in the first mode, the image data is displayed as a three-dimensional virtual object by using the first display module to display the image data to a first eye of a user and the second display module to display the image data to a second eye of the user, and wherein in the second mode, the image data is displayed as a two-dimensional virtual object by using any one of the first display module or the second display module to display the image data to a single eye of the user, the second mode configured to conserve power of the wearable device.

20. The one or more non-transitory computer-readable storage media of claim 19, the operations further comprising:

identifying the moving speed of the wearable device while outputting the image data in the first mode; and determining whether a threshold speed for switching from the first mode to the second mode is exceeded.

* * * * *